United States Patent
Lee (12) 
(10) Patent No.: US 6,363,205 B1
(45) Date of Patent: Mar. 26, 2002

(54) METHOD AND APPARATUS FOR AUTOMATICALLY EDITING PROGRAMS IN VIDEO TAPE COPY SYSTEM

(75) Inventor: Hyong-Ju Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/395,193

(22) Filed: Feb. 27, 1995

Related U.S. Application Data (63) Continuation of application No. 08/096,374, filed on Jul. 26, 1993.

(30) Foreign Application Priority Data

Jul. 24, 1992 (KR) .............................................. 92-13275

(51) Int. Cl.⁷ ................................................. H04N 5/79
(52) U.S. Cl. ............................ 386/62; 386/65; 345/723
(58) Field of Search ............................... 360/14.1–14.3, 360/15, 33.1; 348/589; 358/335; 345/723

(56) References Cited

U.S. PATENT DOCUMENTS

| | | | | |
|---|---|---|---|---|
| 4,568,981 A | * | 2/1986 | Beaulier | 348/589 |
| 4,858,033 A | * | 8/1989 | Chippendale | 360/14.2 |
| 5,056,070 A | * | 10/1991 | Shibuya et al. | 360/33.1 X |
| 5,166,911 A | * | 11/1992 | Misawa et al. | 360/33.1 X |
| 5,291,301 A | * | 3/1994 | Lee | 358/335 |
| 5,479,299 A | * | 12/1995 | Matsumi et al. | 360/14.1 |
| 5,515,173 A | * | 5/1996 | Mankovitz et al. | 360/33.1 X |

* cited by examiner

Primary Examiner—Wendy R. Garber
(74) Attorney, Agent, or Firm—Sughrue Mion, PLLC (57) ABSTRACT

A system for automatically editing programs in an audio and video information copy system, in which programs of the same type or the same time slot among programs recorded at random can readily be detected and copied. The system includes selecting a program to be edited, using time information of the video and audio signals, the time information being recorded together with the video and audio signals in a recording mode, retrieving a program with time information of the selected program from programs recorded on a recording medium of a playback mechanism, and copying the retrieved program on a recording medium of a recording mechanism.

8 Claims, 9 Drawing Sheets

METHOD AND APPARATUS FOR AUTOMATICALLY EDITING PROGRAMS IN VIDEO TAPE COPY SYSTEM

This is a Continuation of application Ser. No. 08/096,374, filed Jul. 26, 1993.

FIELD OF THE INVENTION

The present invention relates in general to audio and video information copy systems, and more particularly, to a method and an apparatus for automatically editing programs in an audio and video information copy system, in which programs of the same type or the same time among programs recorded at random are detected and copied. The present disclosure is based on the disclosure of Korean Patent Application NO. 92-13275 filed Jul. 24, 1992, which disclosure is incorporated herein by reference.

BACKGROUND OF THE INVENTION

It is common that a recording/playback apparatus comprises a recording mechanism for recording video and audio information on a recording medium and a playback mechanism for playing back the recorded video and audio information from the recording medium. Generally, a video and audio information copy system has interconnected two recording/playback apparatuses (a deck for playback and a deck for recording), and is adapted to copy (or record) information recorded on one of the two recording/playback apparatuses onto the other recording/playback apparatus. The arrangement of the two recording/playback apparatuses in a single unit is referred to generally as a double deck recording/playback apparatus.

The recording medium of the recording/playback apparatus such as, for example, a video tape consists of a video track for recording and playing back the video information, an audio track for recording and playing back audio information and a control track for recording and playing back a reference signal for controlling the travelling speed and the phase of the playback mechanism and other driving operations. On the control track, binary information of "0" and "1" are recorded by one bit per two of the video tracks or one frame by means of, for example, N/S magnetic poles. In this case, the "0" and "1" binary information are regularly determined by a predetermined duty ratio.

Recently, various functions of the recording/playback apparatus have been developed. One of the developed functions is to search for a desired program among several programs recorded on the recording medium at a high speed, by varying the duty ratio of the control track. This function is embodied as a sort of video index search system (VISS) in which index information is recorded on certain points of the recording medium, the playback of a desired program is performed by retrieving the corresponding index information using a VISS control key and the recording/playback apparatus is turned into a PLAY mode (or EDIT mode in editing the program) standby state if retrieved.

However, the VISS is desirable in order to detect initial playback points of the multiplicity of programs recorded at random on the recording medium, but has a disadvantage in that it is inconvenient to successively copy a plurality of programs of the same type among the several programs recorded on the recording medium. Namely, in order to successively copy the plurality of programs of the same type among the recorded programs, the initial playback point must be detected every time by the VISS control, the PLAY mode must be performed to ascertain whether the program is to be copied, and the edit control must then be performed.

For example, assume that English conversation educational programs which are periodically watched at the same time slot every day are reserve-recorded by the week on the recording medium. Also, a different program may manually be recorded between the recorded English conversation educational programs on the same recording medium. Further, other programs which are periodically watched at a same time slot may be recorded on the same recording medium. In this case where the programs are recorded at random on the same recording medium, it is difficult to successively playback only the English conversation educational programs from the recording medium. In order to solve this problem, the recording medium must be exchanged whenever the corresponding program is recorded, so that the various programs are not recorded at random on the same recording medium, or only the English conversation educational programs must be detected from the various programs recorded at random on the same recording medium and then again recorded on a different recording medium, utilizing a copy function. However, in the former operation, it is inconvenient to exchange the recording medium whenever the program is recorded, and in the latter operation an inconvenience is caused since the copy of the programs must be performed by the search control and PLAY mode control as mentioned above.

SUMMARY OF THE INVENTION

Therefore, the present invention has been developed in view of the above problems, and it is an object of the present invention to provide a method and an apparatus for automatically editing programs in an audio and video information copy system, in which programs of the same type or the same time slot among programs recorded at random can readily be detected and copied by coding a recording time of each program to be recorded and recording the coded recording time on a recording medium together with video and audio signals of each program.

In accordance with one aspect of the present invention, in a video and audio information copy system comprising a playback mechanism and a recording mechanism arranged in a single unit, said playback mechanism playing back video and audio signals recorded on a recording medium thereof, said recording mechanism recording video and audio signals applied from the outside or the video and audio signals played back by said playback mechanism on a recording medium thereof, there is provided a method of detecting and editing programs of the same type or the same time slot from programs recorded on the recording medium of said playback mechanism, comprising the steps of: selecting a program to be edited, using time information of said video and audio signals, said time information being recorded together with said video and audio signals in a recording mode; retrieving a program with time information of the program selected at the program selecting step from the programs recorded on the recording medium of said playback mechanism; and copying the program retrieved at the retrieving step on the recording medium of said recording mechanism.

In accordance with another aspect of the present invention, in a video and audio information copy system comprising a playback deck for playing back video and audio signals recorded on a recording medium thereof, a recording deck for recording video and audio signals applied from the outside or the video and audio signals played back by said playback deck on a recording medium thereof and a dubbing circuit for transferring the video and audio signals played back by said playback deck to said recording deck, there is provided an apparatus for automatically editing programs, comprising: memory means for storing time information of the video and audio signals recorded on the recording medium of said playback deck; picture display means for displaying said time information thereon; key input means for apply control commands and information to select programs of the same type or the same time slot to be edited, using the time information displayed on said picture display means; and system control means for controlling said recording deck, said playback commands and information from said key input means to retrieve and copy the selected programs from programs recorded on the recording medium of said playback deck.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
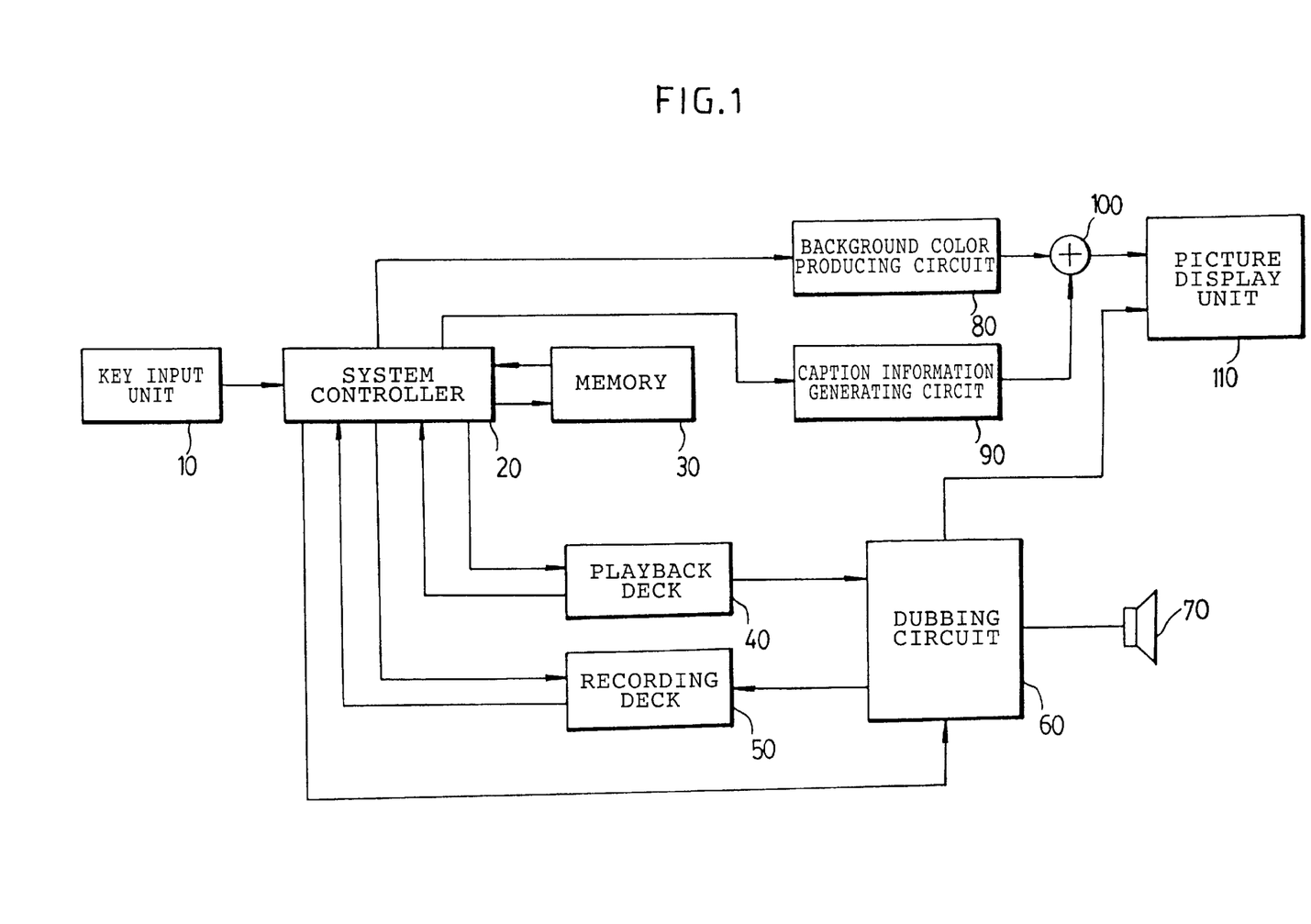
FIG. 1 is a block diagram of an apparatus for automatically editing programs in accordance with the present invention.

Referring to FIG. 1, there is shown a block diagram of an apparatus for automatically editing programs in accordance with the present invention, which is applied to a double deck recording/playback system as an example of an audio and video information copy system. As shown in this drawing, the automatic edit apparatus according to the present invention comprises a key input unit 10 for outputting control commands and information according to a user's selection and a system controller 20 having an input terminal connected to an output terminal of the key input unit 10. The system controller 20 is adapted to control the whole function of the system.

A caption information generating circuit 90 has an input terminal connected to an output terminal of the system controller 20, to output caption information and a background color producing circuit 80 has an input terminal connected to an output terminal of the system controller 20, to produce a background color for the caption information from the caption information generating circuit 90.

A mixer 100 has input terminals connected to output terminals of the caption information generating circuit 90 and the background color producing circuit 80, respectively, to mix the caption information and the background color therefrom.

The automatic edit apparatus of the present invention also comprises a memory 30 having an input terminal connected to an output terminal of the system controller 20 and an output terminal connected to an input terminal of the system controller 20, recording and playback decks 40 and 50 for communicating with the system controller 20, a dubbing circuit 60 having an input terminal connected to an output terminal of the playback deck 40, an output terminal connected to an input terminal of the recording deck 50 and the other input terminal connected to an output terminal of the system controller 20, a picture display unit 110 for displaying a video signal from the dubbing circuit 60 and an output signal from the mixer 100, and a speaker 70 for inputting an audio signal from the dubbing circuit 60. The picture display unit 110 is adapted to display the video signal from the dubbing circuit 60 and the output signal from the mixer 100 under the control of the system controller 20.

Figure 2A:
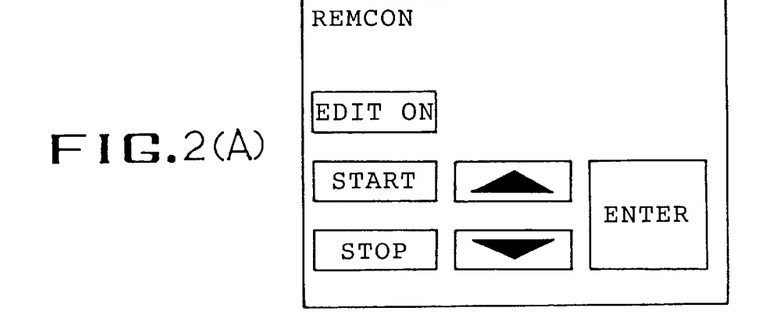
FIGS. 2A to 2D are views illustrating examples of pictures which are displayed through a picture display unit in the automatic edit apparatus in FIG. 1.
Figure 2B:
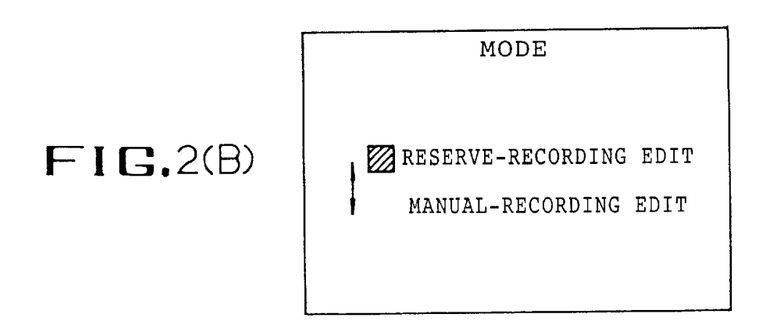
Figure 2C:
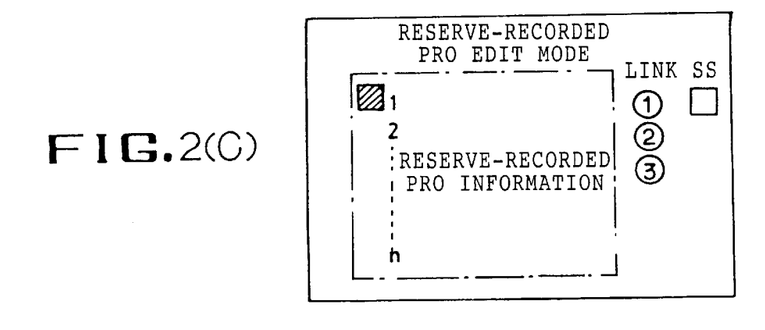
Figure 2D:
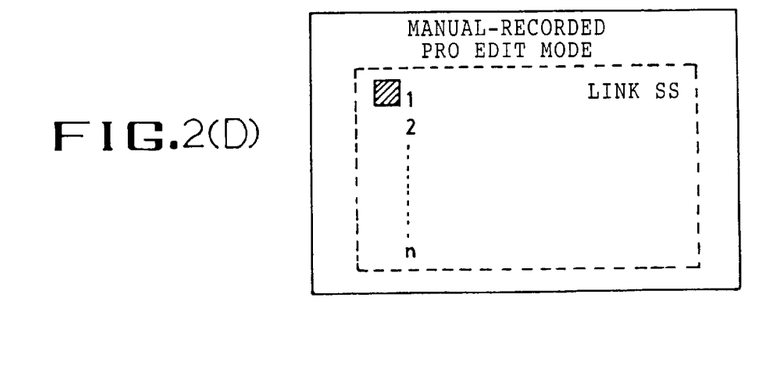

FIGS. 2A to 2D are views illustrating examples of pictures which are displayed through the picture display unit 110 in FIG. 1. In FIG. 2A, there are shown control keys on a remote controller (referred to as hereinafter as remcon) for controlling an edit operation. In FIG. 2B, there is shown a picture which is displayed on the picture display unit 110 when an EDIT ON key on the remcon in FIG. 2A is pushed. In FIG. 2C, there is shown a picture which is displayed on the picture display unit 110 when keys ▼ and ▲ on the remcon in FIG. 2A are pushed to move a cursor ▦ to a reserve-recording edit mode on the picture in FIG. 2B and an ENTER key in FIG. 2A is then pushed. The picture in FIG. 2C is an edit mode picture for setting an edit condition when a reserve-recorded program (PRO) is to be edited. In FIG. 2D, there is shown an edit mode picture for a manual-recorded program (PRO), which is displayed on the picture display unit 110 in a similar manner to that in FIG. 2C. The remcon is included in the key input unit 10 in FIG. 1.

In FIG. 2C, a portion which is numbered 1-n and boxed by a dashed and dotted line indicates time information of a reserve-recorded program which are read from the memory 30. LINK and start search (SS) are option commands in the edit control. The command LINK is one for determining an edit order of successive programs of different time information, among programs recorded on the recording medium. The maximum number of programs whose a copy order can be determined by the command LINK is m. As a result, in the case where the time information in the dashed and dotted line are numbered 1, 2 and 3, the corresponding programs are played back and copied on the recording medium of the recording deck 50 in this order, as will be described later in detail. The command SS is one for searching for the initial date recorded one of the reserve-recorded programs 1-n.

Figure 3:
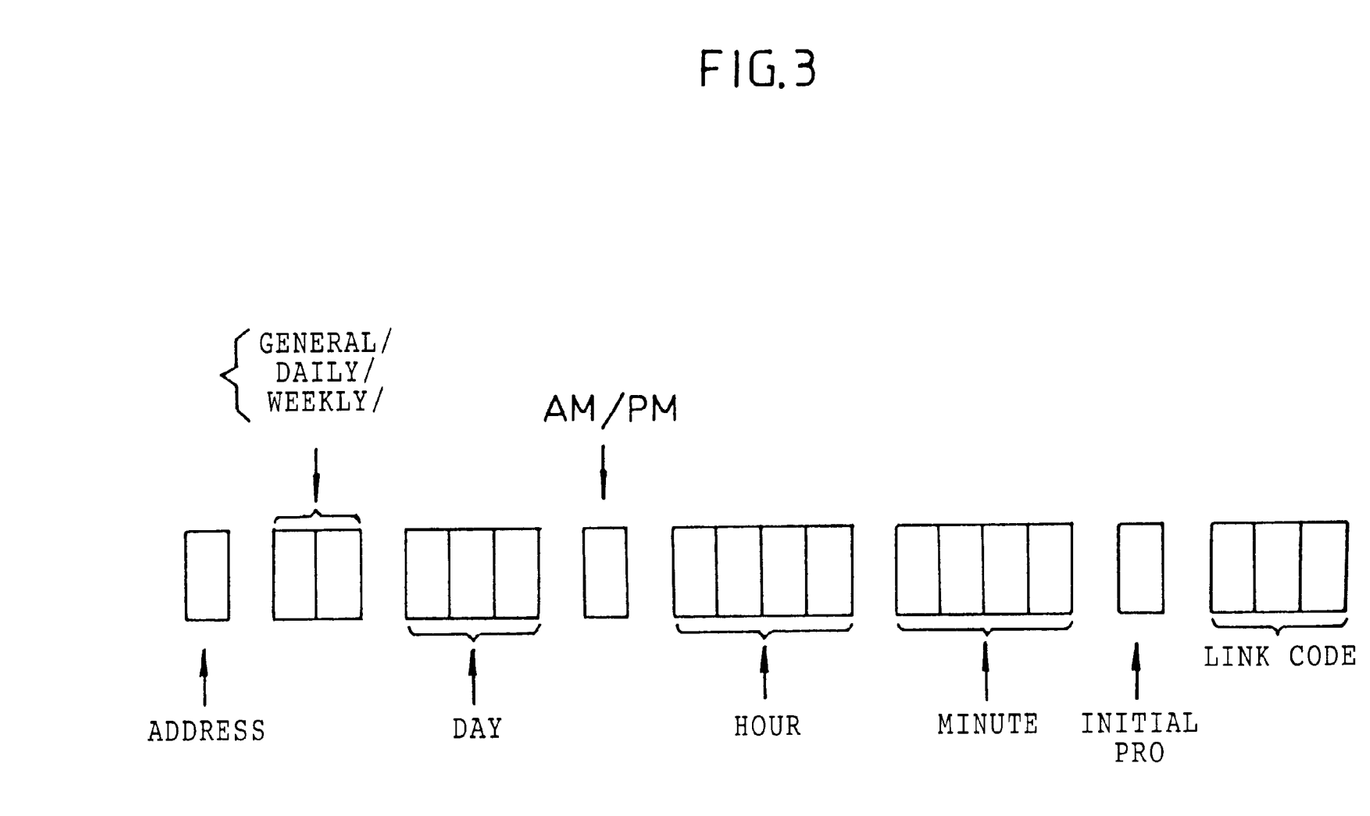
FIG. 3 is a view illustrating an example of coding time information of a program to be recorded.

Referring to FIG. 3, there is shown an example of a code (private code) of the time information of the program to be recorded. In the recording, the total 16 bits are set from an address presence indicting bit to an initial program indicating bit, and the remaining 3 bits are LINK code bits which are set in the edit control. The address presence indicating bit functions similarly to VISS information, and is a reference bit for determining the presence of an address bit recorded on a control track of the recording medium in a high speed search. GENERAL/DAILY/WEEKLY bits function to indicate whether the program to be presently recorded is a general recording program, a program to be recorded daily or a program to be recorded weekly. The general recording is under the manual-recording control and the daily or weekly recording is under the reserve-recording control. DAY bits are adapted to indicate a day on which the program is to be recorded. An AM/PM bit functions to indicate whether the program is to be recorded at a.m. or p.m. HOUR bits function to indicate a corresponding one of 1–12 hours and MINUTE bits function to indicate a corresponding one of 0–60 minutes, and are coded at an interval of 5 minutes. The initial program indicating bit is used in the reserve-recording and set for a program recorded on the initial date. As mentioned previously with reference to FIG. 2, the LINK code bits are used to determine the edit order of the recorded programs according to a user's intention.

In the reserve-recording, the above-mentioned time information bits in FIG. 3 are coded in the form of binary information in response to commands which are specified by the user and thus applied through the key input unit 10, and then recorded on the control track of the recording medium together with the recording of the corresponding program on the recording medium. In manual-recording, the time information which is set by a timer (not shown) of the system at a point of time that the recording mode is controlled is processed in the same manner as that in the reserve-recording. The recording of the time information bits is performed in a desired interval beginning with a recording start point of the corresponding program. The recorded forms of the time information bits in the reserve-recording and the manual-recording are the same, with the exception that the initial program indicating bit is applied to only the reserve-recording. On the other hand, in the case where the present time is the reserve-recording time upon interruption of electric power and the program to be recorded is in progress even after release of the power interruption, the reserve-recording start time information is recorded on the control track of the recording medium, with the audio and video signals of the corresponding program recorded on the corresponding tracks of the recording medium.

Figure 4:
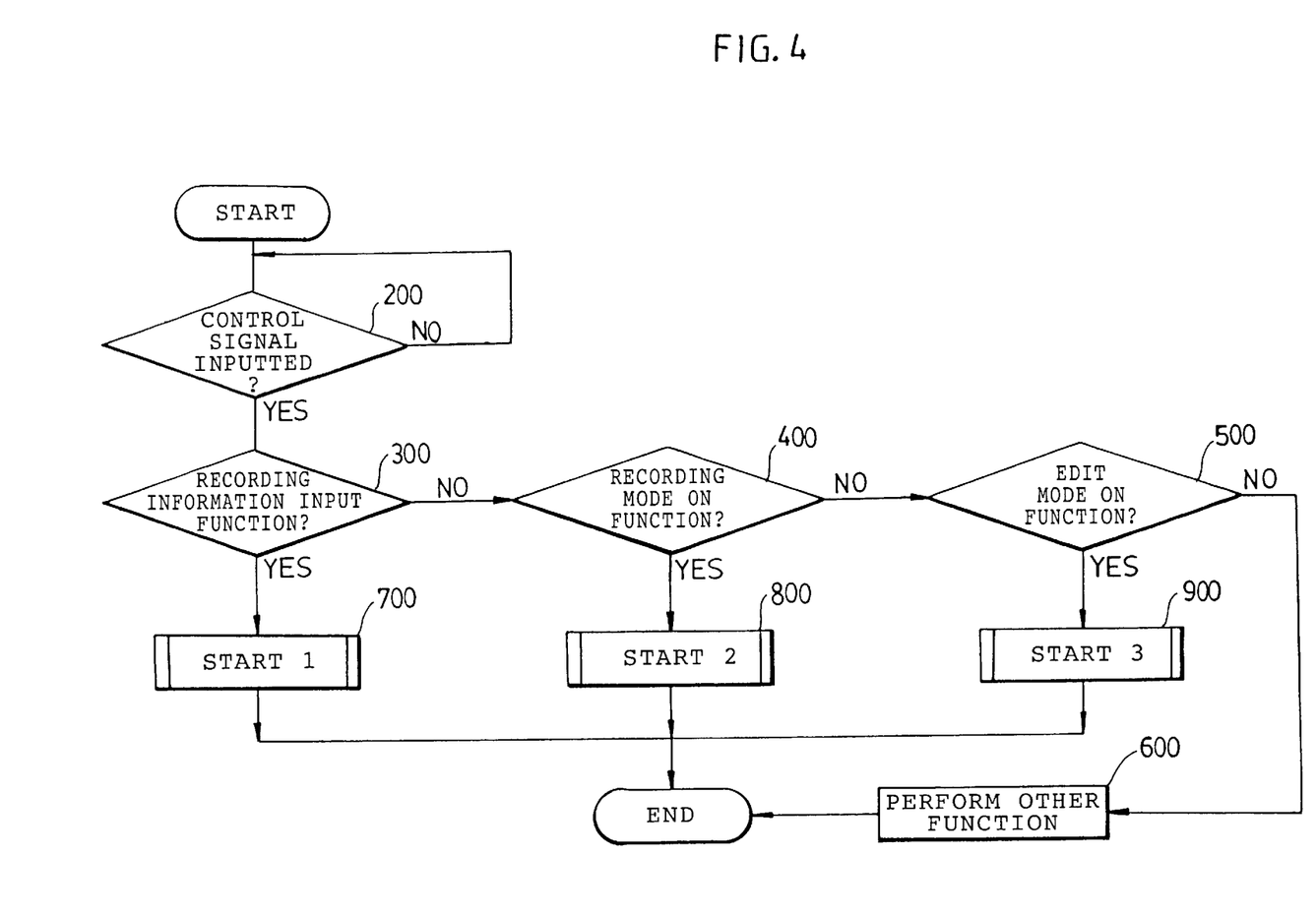
FIG. 4 is a flow chart illustrating a method of automatically editing programs in accordance with the present invention.

Referring to FIG. 4, there is shown a flowchart illustrating a method of automatically editing programs in accordance with the present invention. As shown in this drawing, the automatic edit mode of the present invention comprises the steps 200–600 of selecting a function mode, the step 700 of performing a recording information input function in reserve-recording, the step 800 of performing a recording mode, and the step 900 of performing an edit mode.

Figure 5:
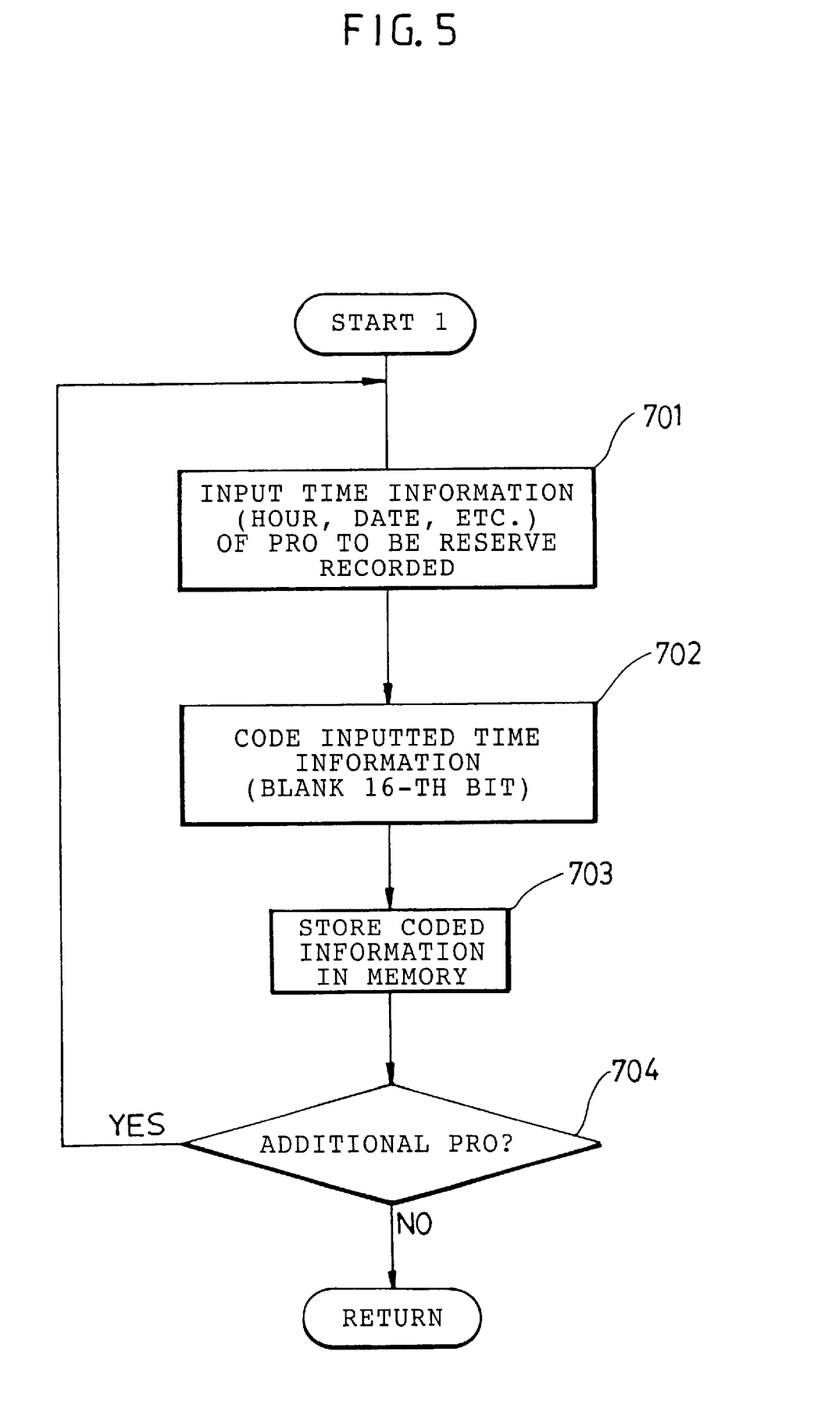
FIG. 5 is a flow chart illustrating a recording information input function performing step in the automatic edit method in FIG. 4.

FIG. 5 is a flowchart illustrating the recording information input function performing step 700 in the automatic edit method in FIG. 4. As shown in this drawing, the recording information input function performing step 700 includes the step 701 of inputting time information of a program to be reserve-recorded, through the key input unit 10, the step 702 of coding the inputted time information, the step 703 of storing the coded information into the memory 30, and the step 704 of determining whether an additional program to be reserve-recorded is present.

Figure 6:
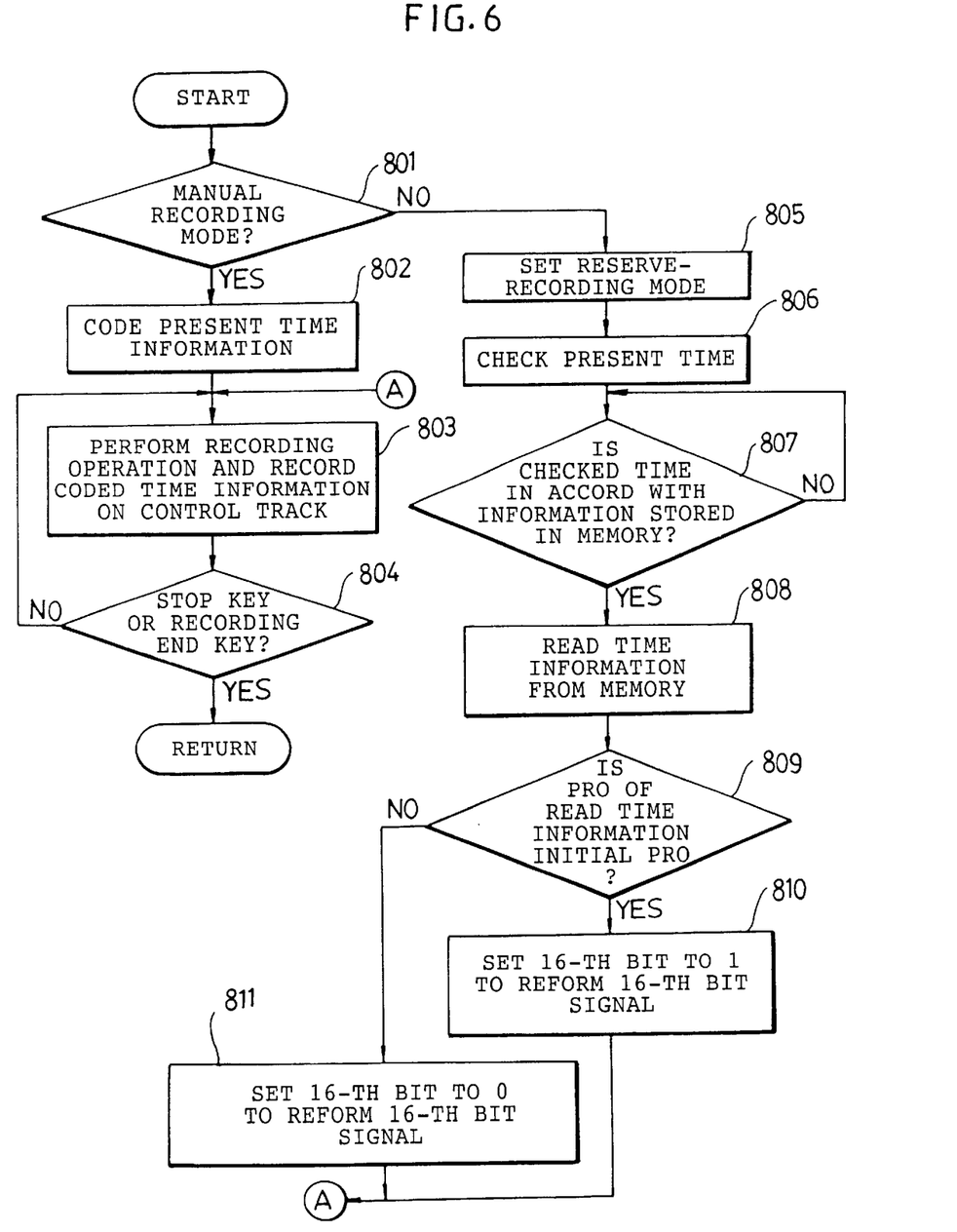
FIG. 6 is a flowchart illustrating a recording mode ON function performing step in the automatic edit method in FIG. 4.

FIG. 6 is a flowchart illustrating the recording mode ON function performing step 800 in the automatic edit method in FIG. 4. As shown in this figure, the recording mode ON function performing step 800 includes the steps 801–804 of controlling the manual-recording operation and the steps 805–811 of controlling the reserve-recording operation.

Figure 7A:
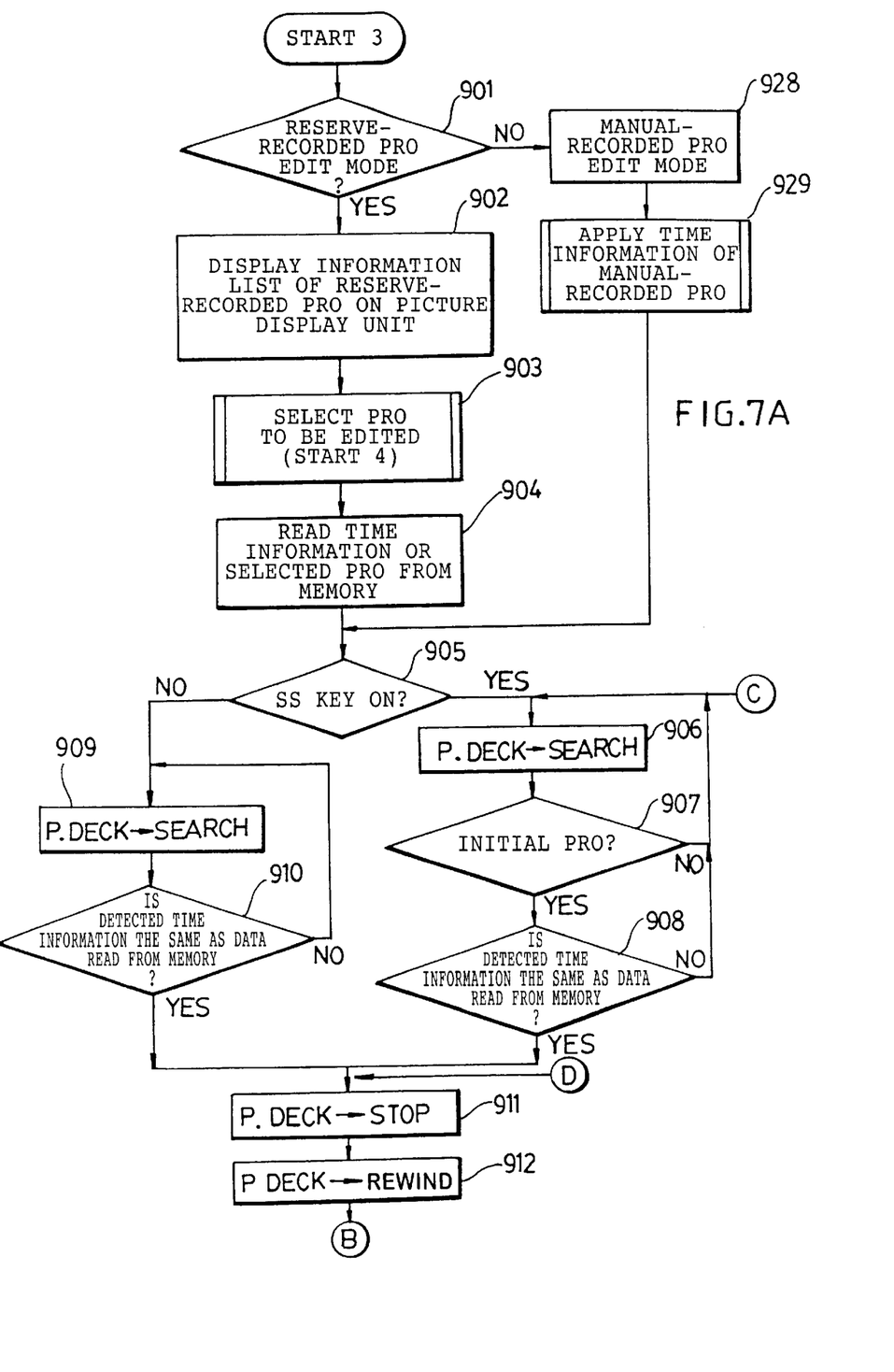
FIGS. 7A–7B are flowcharts illustrating an edit mode ON function performing step in the automatic edit method in FIG. 4.
Figure 7B:
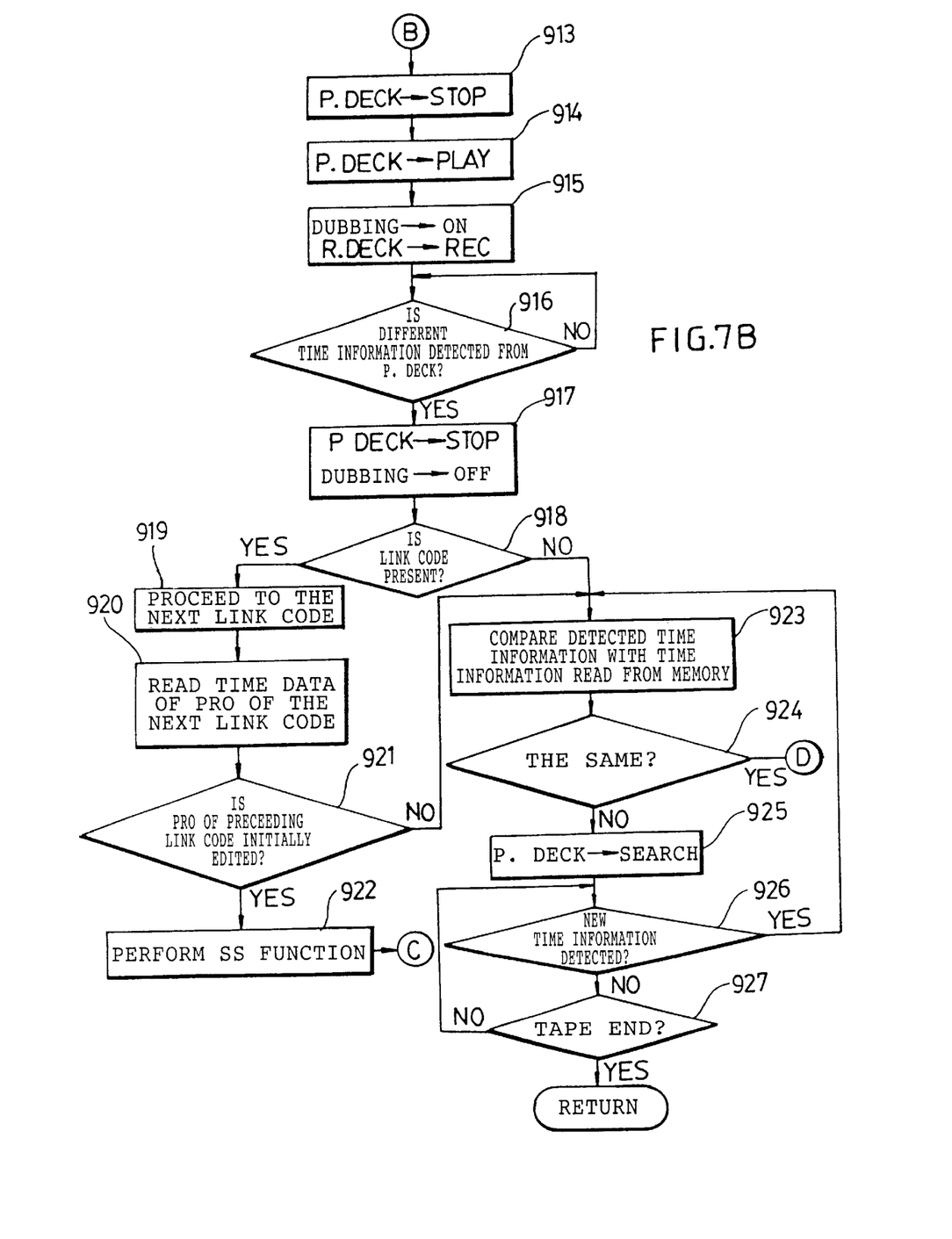

FIGS. 7A–7B are flowcharts illustrating the edit mode ON function performing step 900 in the automatic edit method in FIG. 4. As shown in these drawings, the edit mode ON function performing step 900 includes the steps 901–904 of setting an edit condition of the reserve-recorded program, the steps 928 and 929 of inputting edit information of the manual-recorded program, and the steps 905–927 of retrieving (or searching) the program and performing the edit operation.

Figure 8:
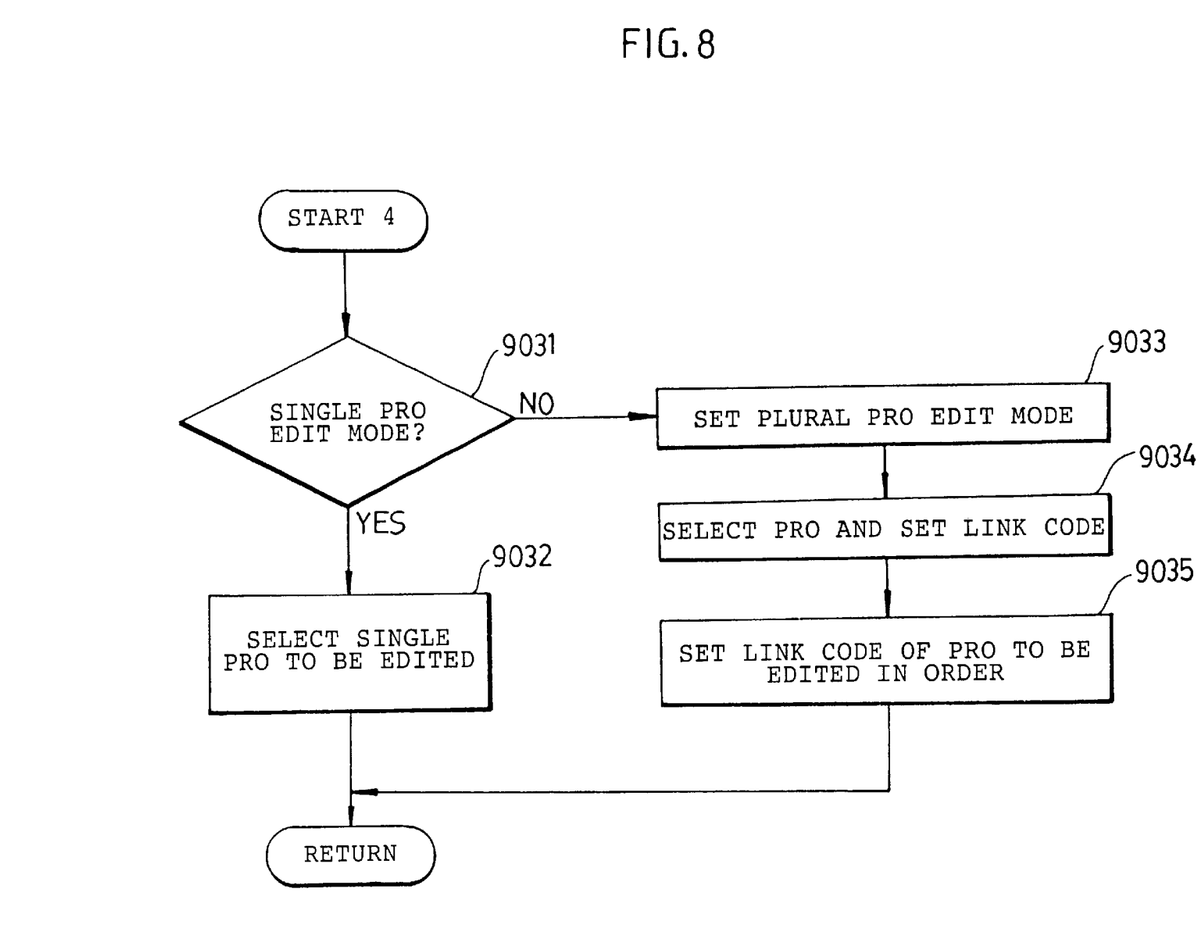
FIG. 8 is a flowchart illustrating a subroutine of the step of selecting a program to be edited, in the edit mode ON function performing step in FIGS. 7A–7B.

FIG. 8 is a flowchart illustrating a subroutine of the step 903 of selecting a program to be editted, in the edit mode ON function performing step in FIGS. 7A–7B. As shown in this figure, the step 903 of selecting a program to be edited includes the step 9032 of selecting a single program and the steps 9033–9035 of selecting a plurality of programs.

The operation of the automatic edit apparatus with the construction in FIG. 1 in accordance with the present invention will hereinafter be described in detail with reference to FIGS. 2 and 4 to 8.

Upon inputting the control signal from the function key on the key input unit 10 at step 200 in FIG. 4, the system controller 20 controls the function of the system in response to the inputted control signal.

When the inputted control signal is one for performing the recording information input function, the system controller 20 recognizes that the recording information for the reserve-recording is to be inputted, and proceeds to a standby state to detect the recording information which is to be applied through the key input unit 10. At this time, the user applies the time information (to be coded as shown in FIG. 3) necessary to the reserve-recording to the system controller 20 at step 701 in FIG. 5. The system controller 20 codes the applied time information at step 702. The coding of the applied time information is performed by classifying it as shown in FIG. 3.

The forms of the bits classified as shown in FIG. 3 will be described in detail. The coding information of the address presence indicating bit is "1" or "0" because it is one bit. In the case of recording the time information of the program to be recorded, the address presence indicating bit is coded to "1" and if not so, it is coded to "0". Therefore, the address presence indicating bit is commonly "1" herein since the time information is recorded on the recording medium in the present embodiment. Also, although the address presence indicating bit is herein designated as one bit for the convenience of the description, it may be designated as a number of bits similar to that of the VISS information because it functions similarly to the VISS information as mentioned above.

The GENERAL/DAILY/WEEKLY bits are designated as two bits and similarly coded to the binary information. For example, when the GENERAL mode is selected through the key input unit 10, the GENERAL/DAILY/WEEKLY bits are coded to "01" when the DAILY mode is selected through the key input unit 10 and as "10" when the WEEKLY mode is selected therethrough. The DAY bits are designated as three bits because seven days are present in a week. For example, Sunday is coded to "000" and Saturday is coded to "110". Also, in the case when it is not necessary to designate the day, the DAY bits are coded to "111". The AM/PM bit is designated as one bit. Accordingly, the AM/PM BIT is coded to "0" when AM is selected through the key input unit 10, and as "1" when PM is selected therethrough. The HOUR bits are designated as four bits because 1–12 hours may be present, and coded to 0001–1100. The MINUTE bits are similarly designated as four bits, and coded at an interval of 5 minutes between 0 and 60 minutes. Namely, the 5 minutes are coded to "0001" and the 60 minutes are coded to "1100". The initial program indicating bit is blanked in the case where the recording information is coded, and the bit form thereof is determined when the recording is substantially performed, by discriminating whether the present program is recorded on the initial date. In the present embodiment, the initial program indicating bit is designated as one bit, and is recorded as "1" on the recording medium when the present program is recorded on the initial date, and as "0" when the present program is not recorded on the initial date. The LINK code bits are used to determine the edit order of m successive ones among n programs non-periodically recorded on the recording medium, according to a user's intention, as mentioned previously with reference to FIG. 2. In the case where the LINK code bits are designated as three bits, the edit order of the maximum 6 programs is determined. For example, provided that the LINK code bits are set to "000" in the case where it is not necessary to designate the LINK code, the LINK code bits are set to "001" for the sixth program to be edited. It should be noted that the number of bits allocated to each time information can be varied according to a variation in the inputted time information.

For example, provided that a program to be reserve-recorded is broadcasted at 7:30 p.m. on Wednesday every week, the address presence indicating bit is set to "1", the GENERAL/DAILY/WEEKLY bits are set to "10", the DAY bits are set to "011", the AM/PM bit is set to "1", the HOUR bits are set to "0111", and the MINUTE bits are set to "0110". In this case, the initial program indicating bit is blanked as mentioned above. In this manner, the coding of the inputted recording time information is performed and the resulting coding information is "110011101110110X", where X represents the blanked state of the initial program indicating bit. Upon completion of the coding operation using 16 bits allocated to the time information, the system controller 20 stores the coded time information in a desired location of the memory 30 at step 703. Then at the step 704, the system controller 20 determines whether an additional program to be reserve-recorded is present. If an additional program to be reserve-recorded is present, then the system controller 20 performs steps 701–703 repeatedly. On the other hand, if no additional program to be reserve-recorded is present, the system controller 20 returns to the next step.

By the way, if the control signal (or command) applied through the key input unit 19 is one for performing the recording mode ON function at step 400 in FIG. 4, then the system controller 20 checks at step 801 in FIG. 6 whether the present recording mode is the manual-recording mode or the reserve-recording mode. The manual-recording mode is controlled by a recording (REC) function key on the key input unit 10. In this connection, the checking of the recording mode is performed by discriminating it as the manual-recording mode if it is ON under the control of the REC function key and as the reserve-recording mode if not so. This is because a main power of the system is not turned off in the reserve-recording mode and, therefore, the system is always in the recording standby state in that case.

In the manual-recording mode, the system controller 20 codes the output of the timer at the point of time that the recording mode is controlled, as the time information of the program to be recorded, as shown in FIG. 3, at step 802 (FIG. 6). At this time, the output of the timer may be displayed through a digitron (not shown) or other similar device mounted in the system. Then, the program, which is inputted through a tuner or external signal input means (not shown), and the coded time information are recorded on the corresponding tracks of the recording medium at step 803. The tracks of the recording medium are audio, video and control tracks which are classified according to the type of recorded information, such as the audio and video information and the time information. The above-mentioned recording operation continues to be performed until a STOP control signal or a recording end signal is applied through the key input unit 10. The recording end signal may be generated from the recorded program or detected by sensing the end of the recording medium.

On the other hand, if it is checked at the step 801 in FIG. 6 that the present recording mode is not the manual-recording mode, the system controller 20 sets the function of the system to the reserve-recording mode at step 805. Then at step 806, the system controller 20 checks the present time by checking the output of the timer which is the time information in the manual-recording mode as mentioned previously. The system controller 20 also checks at step 807 whether the checked time is in accord with the time information of the program to be reserve-recorded, stored in the memory 30. When the checked time is not in accord with the time information stored in the memory 30, the above step 807 is repeatedly performed. On the other hand, when the checked time is in accord with the time information stored in the memory 30, the system controller 20 reads the time information stored in the memory 30 at step 808.

The system controller 20 then checks at step 809 whether the program to be presently recorded is the initial program after the input of the reserve-recording information. If it is checked at the step 809 that the program to be presently recorded is the initial program, then the system controller 20 reforms the 16-bit signal by setting the blanked sixteenth bit to "1" at step 810. If it is checked at step 809 that the program to be presently recorded is not the initial program, the system controller 20 reforms the 16-bit signal by setting the blanked sixteenth bit to "0" at step 811. In this case, the bit form is determined by a counter register (not shown) in the system controller 20 which is allocated to each program. Namely, the counter register in the system controller 20 performs an up-counting operation whenever the time information is read at step 808. In order to set the initial program indicating bit, the system controller 20 outputs "1" only when a count output of the counter register is "1", and outputs "0" when the count output thereof is any value other than "1". Upon completion of reforming the 16-bit signal, the system controller 20 records the program and the coded time information of the 16-bit signal on the corresponding tracks of the recording medium of the recording deck 50 at step 803 similarly to that in the manual-recording mode.

It is difficult to play back only the periodically recorded programs in the case where the programs are randomly recorded on the recording medium. For this reason, it is efficient to record only programs of the same type or the same time slot on a specified recording medium and play back them from the medium. To this end, the key input unit 10 outputs the edit mode ON function control signal when the EDIT ON key thereof shown in FIG. 2A is pushed, at step 500. In response to the edit mode ON function control signal, the system controller 20 outputs its control signals to the background color producing circuit 80 and the caption information generating circuit 90, so that the picture as shown in FIG. 2B can be displayed on the picture display unit 110. Under the condition that the user moves the cursor ※ on the picture displayed on the picture display unit 110 to a desired one of the edit modes using the keys ▼ and ▲ in FIG. 2A and pushes the ENTER key in FIG. 2A, the system controller 20 checks in response to the corresponding control signal from the key input unit 10 at the step 901 whether the reserve-recorded program edit mode is ON or the manual-recorded program edit mode is ON.

If it is checked at step 901 that the reserve-recorded program edit mode is ON, the system controller 20 performs control at step 902 such that the information lists regarding the reserve-recorded programs are displayed on the picture display unit 110 as shown in FIG. 2C. In this case, the time information regarding the reserve-recorded programs are displayed on the picture display unit 110 in the form of the caption information which is generated from the caption information generating circuit 90, as will be described later in detail. The picture as shown in FIG. 2C may be displayed on the whole screen of the picture display unit 110 or may be displayed partially on the screen. The caption information generating circuit 90 is adapted to generate character and graphic information under the control of the system controller 20. The background color producing circuit 80 is adapted to produce the background color of the caption information from the caption information generating circuit 90 under the control of the system controller 20, where the background color may be, for example, a blue color and others. The mixer 100 mixes the output signals from the background color producing circuit 80 and caption information generating circuit 90 and outputs the mixed signal to the picture display unit 110. These background color producing circuit 80, caption information generating circuit 90 and mixer 100 are described in Korean Patent Application No. 91-4989, filed by the inventor on Mar. 29, 1991.

At step 903 in FIG. 7, the programs to be edited are selected on the picture displayed in the above-mentioned manner. The selection is performed by using the cursor ▓ according to the type of the programs to be copied (edited) or using the LINK command. The type of the programs to be copied is classified into a single program copy and a plural program copy, and is determined by step 9031 in FIG. 8. The single program copy is to copy only the programs of the same time slot and the plural program copy is to copy successive series programs of different time slots. The plural program copy is not limited to the series programs since it is for a variety of program edit functions.

The single program copy mode is selected by using the cursor as mentioned above. As a result, when the cursor is used to select the program to be edited, the system controller 20 recognizes that the single program edit mode is selected by the user, and then checks at step 9032 the movement of the cursor to select the programs on the line to which the cursor is moved. Namely, when the picture as shown in FIG. 2C is displayed on the picture display unit 110, the user can select the single program copy mode by moving the cursor to the desired time information listed line using the keys ▼ and ▲ in FIG. 2A, and then by pushing the ENTER key.

On the other hand, when the cursor is not used, the system controller 20 determines that the plural program edit mode is selected by the user and then sets the plural program edit mode at step 9033. The selection of the programs to be edited is performed at step 9034 by using the LINK code as mentioned above. For example, assume that the number of the reserve-recording information displayed on the screen is n and the first, third and fifth of them correspond to the programs to be edited. Where the programs are to be edited in the order of, for example, 3, 1 and 5, the first program information is set to a LINK code indicative of the second order copy, the third program information is set to a LINK code indicative of the first order copy, and the fifth program information is set to a LINK code indicative of the third order copy. The order of the reserve-recording information of the programs to be edited can be displayed by, for example, the Arabic numerals as shown in FIG. 2C. The system controller 20 determines the order of the reserve-recording information of the programs to be edited, by coding the LINK code bits as shown in FIG. 3 in the form of binary information. Namely, when the LINK code bits are designated as three bits as mentioned above with reference to FIG. 3, the LINK code bits of the first program information are set to "001" and then added to the 16-bit information. The LINK code bits are similarly added to the time information of the third and fifth programs. The LINK code bits are stored in a register of the system controller 20 so that they can be matched with the corresponding 16-bit information read from the memory 30.

Upon the selection of the programs to be edited, in this manner, the system controller 20 reads the time information of the selected program from the memory 30 at step 904 in FIG. 7A. At this time, the system controller 20 merely reads the time information from the memory 30 in the case of the single program edit, but matches the read time information with the LINK code in the case of the plural program edit as mentioned above.

Then, the system controller 20 checks at step 905 whether the initial program is searched for. If it is checked at the step 905 that the initial program is searched for, then the system controller 20 controls the operation such that the caption information "0" is generated at the SS portion on the screen. It should here be noted that the SS caption information may be in the form other than "0" and "1".

When the edit condition is determined as mentioned above, the system controller 20 enters the substantial edit operation. At steps 906 and 909, the system controller 20 sets the playback deck 40 to a search mode regardless of ON/OFF states of a SS key at step 905. When the SS key is ON, the initial program is searched for as the first target at step 907. In the case where the SS key is OFF, the programs to be edited are searched for as the target, where it is assumed that the search is performed beginning with the start point of the recording medium of the playback deck 40. Upon detection of time information from the control track of the recording medium when performing the search mode, the system controller 20 checks at steps 908 and 910 whether the detected time information is the same as data read from the memory 30. If it is not the same, then the search mode continues to be performed until the next time information is detected.

When the detected time information is the same as the data read from the memory 30, the system controller 20 applies at step 911 the stop mode control signal to the playback deck 40 to stop it. Then at step 912, the system controller 20 controls the playback deck 40 in a rewind mode to feed back the recording medium to a desired point, which is an initial bit point of the coded time information recorded on the recording medium. Upon detection of the initial bit point of the coded time information, the playback deck 40 is controlled in the stop mode and then in the play (playback) mode at steps 913 and 914. Also, the system controller 20 outputs at step 915 a control signal to the dubbing circuit 60 to turn it on and a control signal to the recording deck 50 to control the recording mode. As a result, the played-back signal from the playback deck 40 is applied to the recording deck 50 through the dubbing circuit 60, which also applies the video signal from the playback deck 40 to the picture display unit 110 and the audio signal from the playback deck 40 to the speaker 70.

When different time information is detected from the recording medium of the playback deck 40 in during the copy (edit) operation at step 916, the system controller 20 outputs at step 917 the stop mode control signal to the recording deck 50 and a control signal to the dubbing circuit 60 to turn it off. Then at step 918, the system controller 20 checks whether the LINK code is present in the time information of the copied program. This is irrespective of the single program copy mode, but is for controlling the copy order in the case of the plural program copy mode.

If it is checked at the step 918 that the LINK code is not present in the time information of the copied program, then the system controller 20 compares newly detected time information with time information read from the memory 30 at step 923. If the newly detected time information is the same as the time information read from the memory 30 as a result of the comparison, then the system controller 20 performs the copy operation by repeating steps 911–918. On the other hand, if it is not the same, then the system controller 20 sets, at step 925, the playback deck 40 in the search mode under the condition that the recording deck 50 is set in the stop mode. The search continues to be performed until new time information is detected at step 926 or an end point of the recording medium is detected at step 927. Upon detection of the new time information through the search, steps 923–925 are repeatedly performed.

On the other hand, if it is checked at the step 918 that the LINK code is present in the time information of the copied program, then the system controller 20 proceeds to a program of the next LINK code at the step 919. For example, assume that the first, third and fifth of the time information displayed in FIG. 2C correspond to the programs to be copied, and the programs are to be copied in the order of 3, 1 and 5. In this case, the program of the third time information is searched for and copied at step 915. Also, even when the program of the first time information is positioned ahead of the program of the third time information on the recording medium, the program of the third time information is first copied. However, this case is a very rare occurrence, because the programs of the different time information to be successively copied are commonly in the form of a series and, therefore, the recording order thereof is usually reasonable.

Accordingly, the program of the next LINK code proceeding at step 919 is the program of the first time information, which then is read from the memory 30 at step 920. The system controller 20 checks at step 921 whether the program of the proceeding LINK code is initially edited. If it is checked at step 921 that the program is initially edited, the system controller 20 performs the SS function by setting the playback deck 40 in the search mode at step 906 and detecting the initial program at step 907, and then performs steps 908 and 911–917. On the other hand, if it is checked at step 921 that the program is not initially edited, then the system controller 20 proceeds to step 923 to determine whether the 16-bit information detected from the playback 40 is the same as the time information read from the memory 30, and then performs steps 924–927 repeatedly.

If it is checked at the step 901 that the manual-recorded program edit mode is set, the picture regarding the manual-recorded program edit mode is displayed as shown in FIG. 2D on the picture display unit 110 similarly to that in the reserve-recorded program edit mode. In FIG. 2D, the manual-recorded program edit mode picture is displayed with its portion boxed by dashed and dotted line remaining empty. For this reason, the user must apply the time information of the manual-recorded program directly through the key input unit 10 at step 929.

When the time information of the program to be edited is inputted in the above manner and the LINK and SS codes are set as in the reserve-recorded program edit mode, the edit operation is performed in the same manner as that in the reserve-recorded program edit mode.

As hereinbefore described, according to the present invention, in the audio and video information copy system, the program and the time information thereof are simultaneously recorded on corresponding tracks of the recording medium in the reserve-recording or the manual (general) recording. Therefore, periodic programs among the programs recorded at random on the recording medium can be readily detected and edited. In particular, the initially recorded program can be searched for and the randomly recorded programs can be edited in the form of a series by setting the LINK code.

Although the preferred embodiments of the present invention have been disclosed for illustrative purposes, those skilled in the art will appreciate that various modifications, additions and substitutions are possible, without departing from the scope and spirit of the invention as defined in the accompanying claims.

What is claimed is:

1. In a video and audio information copy system comprising a playback mechanism and a recording mechanism arranged in a single unit, said playback mechanism playing back video and audio signals recorded on a recording medium thereof, said recording mechanism recording externally applied video and audio signals or video and audio signals played back by said playback mechanism on a recording medium thereof, a method of detecting and editing programs of the same time slot from programs recorded on the recording medium of said playback mechanism, comprising the steps of:

selecting a program to be edited, using time information of said video and audio signals, said time information being recorded together with said video and audio signals in a recording mode;

retrieving a program with time information of the program selected at the program selecting step from the programs recorded on the recording medium of said playback mechanism; and copying the program retrieved at the retrieving step on the recording medium of said recording mechanism;

wherein the program selecting step includes:

a single program selecting step of selecting a plurality of programs of a single periodic time slot using said time information; and a plural program selecting step of selecting a successive series of programs of different time slots using said time information.

2. The method as defined in claim 1, wherein the plural program selecting step includes the step of:

setting a specified code to determine an edit order when the programs are selected.

3. The method as defined in claim 1, wherein the plural program selecting step includes the step of:

setting a specified code so that the selected programs can be copied, said programs being rotated according to a designated order until a copying operation is stopped by sensing an end of the recording medium of said playback mechanism or by a copying operation stop control command.

4. The method as defined in claim 3, wherein the copying step includes the step of:

copying one of the selected programs according to an order of the specified code designated at the plural program selecting steps, and then proceeding to a specified code of one of the selected programs corresponding to the next copy order.

5. In a video and audio information copy system comprising a playback deck for playing back video and audio signals recorded on a recording medium thereof, a recording deck for recording externally applied video and audio signals or the video and audio signals played back by said playback deck on a recording medium thereof and a dubbing circuit for transferring the video and audio signals played back by said playback deck to said recording deck, an apparatus for automatically editing programs, comprising:

memory means for storing time information of the video and audio signals recorded on the recording medium of said playback deck;

picture display means for displaying said time information thereon;

key input commands for applying control commands and information to select programs of the same periodic time slot to be edited, said key input means using the time information displayed on said picture display means;

system control means for controlling said recording deck, said playback deck and said dubbing circuit in response to the control commands and information from said key input means to retrieve and copy selected programs from programs recorded on the recording medium of said playback deck; and a background color producing circuit for producing a background color.

6. The apparatus as defined in claim 5, further comprising a caption information generating circuit for generating caption information.

7. The apparatus as defined in claim 6, further comprising a mixer circuit for mixing the produced background color with the generated caption information so as to provide a mixed signal.

8. The apparatus as defined in claim 7, wherein said picture display means is connected to receive said mixed signal.

* * * * *